(12) United States Patent
Esposito et al.

(10) Patent No.: US 9,741,049 B2
(45) Date of Patent: Aug. 22, 2017

(54) GENERATION OF COST-PER-BRAKING EVENT VALUES

(71) Applicant: Honeywell International Inc., Morristown, NJ (US)

(72) Inventors: Carl Esposito, Phoenix, AZ (US); Robert Witwer, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 567 days.

(21) Appl. No.: 14/030,805

(22) Filed: Sep. 18, 2013

(65) Prior Publication Data
US 2015/0081394 A1    Mar. 19, 2015

(51) Int. Cl.
G06Q 40/00    (2012.01)
G06Q 30/02    (2012.01)
G06Q 30/04    (2012.01)
B60T 17/22    (2006.01)

(52) U.S. Cl.
CPC ......... G06Q 30/0206 (2013.01); G06Q 30/04 (2013.01); B60T 17/22 (2013.01); B60T 17/221 (2013.01)

(58) Field of Classification Search
CPC .... G06Q 30/0206; G06Q 30/04; B60T 17/22; B60T 17/221; B61L 15/0081
See application file for complete search history.

(56) References Cited

U.S. PATENT DOCUMENTS

| | | | |
|---|---|---|---|
| 5,390,120 A | 2/1995 | Caron et al. | |
| 6,398,162 B1 * | 6/2002 | Stimson | B60T 8/00 188/16 |
| 6,929,333 B2 * | 8/2005 | DeVlieg | B60T 8/1703 188/1.11 L |
| 8,152,246 B2 | 4/2012 | Miller et al. | |
| 8,355,850 B2 | 1/2013 | Rado | |
| 2004/0011596 A1 * | 1/2004 | Miller | B60T 17/22 188/1.11 W |
| 2007/0015518 A1 * | 1/2007 | Winter | G08G 1/205 455/456.1 |
| 2008/0141780 A1 * | 6/2008 | Wavering | G01N 17/04 73/723 |
| 2010/0081457 A1 * | 4/2010 | Jerome | H04L 12/1818 455/456.3 |
| 2010/0273460 A1 * | 10/2010 | Dorbie | G06Q 10/109 455/414.1 |
| 2011/0144879 A1 | 6/2011 | Miller et al. | |
| 2012/0089474 A1 | 4/2012 | Xiao et al. | |

(Continued)

OTHER PUBLICATIONS

Extended Search Report from counterpart European Patent Application No. 14182738.6, dated Feb. 6, 2015, 6 pp.

(Continued)

*Primary Examiner* — Matthew Gart
*Assistant Examiner* — Stephen S Swartz
(74) *Attorney, Agent, or Firm* — Shumaker & Sieffert, P.A.

(57) ABSTRACT

Systems and techniques are described for generating cost values for a plurality of braking events of an aircraft, where each cost value is based on an expected wear of the wheel-and-brake assembly of the aircraft during the respective braking event. The systems and techniques may take into account data representative of conditions during the respective braking event of the aircraft to generate the cost values.

17 Claims, 3 Drawing Sheets

(56) References Cited

U.S. PATENT DOCUMENTS

2013/0112807 A1* 5/2013 Cox .................. B64C 25/36
                                                244/50
2014/0350756 A1* 11/2014 Schoonmaker ......... B61L 3/006
                                                701/19
2015/0014478 A1* 1/2015 Lassen .................. B64C 19/00
                                                244/49

OTHER PUBLICATIONS

Response to the Communication pursuant to Rules 70(2) and 70a(2) EPC from counterpart European Application No. EP14182738.6, filed Sep. 24, 2015, 15 pp.

Examination Report from counterpart European Application No. 14182738.6-1955, dated Nov. 14, 2016, 6 pp.

Response to Examination Report dated Nov. 14, 2016, from counterpart European Application No. 14182738.6, filed Mar. 7, 2017, 11 pp.

* cited by examiner

GENERATION OF COST-PER-BRAKING EVENT VALUES

TECHNICAL FIELD

The disclosure relates to generation of cost-per-braking event values for aircrafts.

BACKGROUND

A wheel-and-brake assembly of an aircraft can include a stack of interleaved brake discs, one set of which may be mounted to a fixed support to form the stators of the assembly and another set of which may be mounted to rotate with the wheel and extend into the spaces between the stators to form the rotors of the assembly. The assembly may also include one or more pistons for pressing the stator at one end of the disc stack to force the rotors and stators into frictional engagement to slow the wheel of the assembly during braking, such as during landing of the aircraft. As a result of external factors and frictional forces during braking, wheel-and-brake assemblies of aircrafts sustain wear during landings of the aircrafts, including during taxiing.

SUMMARY

In general, the disclosure describes devices, systems, and techniques for generating cost values for a plurality of braking events of an aircraft, where each cost value is based on an expected wear of the wheel-and-brake assembly of the aircraft during the respective braking event. In the examples described herein, a braking event may include any time during which brakes of the aircraft are in use, such as during touchdown, taxiing, parking, emergency usage (e.g., a rejected takeoff), and the like. Accordingly, the cost value for a particular braking event of an aircraft may differ from the cost value for a different braking event of the aircraft. The devices, systems, and techniques may take into account data representative of conditions during the respective braking event of the aircraft to determine the cost value associated with the particular braking event, where the cost value may represent the cost of the usage of the brakes during the particular braking event. In this way, the systems and techniques described herein may facilitate real-time billing and cost analysis that is more directly correlated to expected wear on the wheel-and-brake assembly during a respective braking event and maintenance following the braking event, in comparison to examples in which a flat cost-per-braking event value is predetermined and applied to all braking events of the aircraft or customer.

In one example, the disclosure is directed to a method for generating cost-per-braking event values, the method comprising receiving, with a processor, first data representative of conditions during a first braking event of an aircraft; generating, with the processor, a first cost value corresponding to the first braking event based on the first data, wherein the first cost value is based on an expected wear on a wheel-and-brake assembly of the aircraft during the first braking event; receiving, with the processor, second data representative of conditions during a second braking event of the aircraft; and generating, with the processor, a second cost value corresponding to the second braking event based on the second data, wherein the second cost value is based on an expected wear on the wheel-and-brake assembly of the aircraft during the second braking event.

In another example, the disclosure is directed to a system configured to generate cost-per-braking event values, the system comprising a processor configured to receive first data representative of conditions during a first braking event of an aircraft, generate a first cost value corresponding to the first braking event based on the first data, receive second data representative of conditions during a second braking event of the aircraft, and generate a second cost value corresponding to the second braking event based on the second data, wherein the first cost value is based on an expected wear on a wheel-and-brake assembly of the aircraft during the first braking event and the second cost value is based on an expected wear on the wheel-and-brake assembly of the aircraft during the second braking event.

In another example, the disclosure is directed to a system configured to generate cost-per-braking event values, the system comprising means for receiving first data representative of conditions during a first braking event of an aircraft; means for generating a first cost value corresponding to the first braking event based on the first data, wherein the first cost value is based on an expected wear on a wheel-and-brake assembly of the aircraft during the first braking event; means for receiving second data representative of conditions during a second braking event of the aircraft; and means for generating a second cost value corresponding to the second braking event based on the second data, wherein the second cost value is based on an expected wear on the wheel-and-brake assembly of the aircraft during the second braking event.

In another example, the disclosure is directed to a non-transitory computer-readable medium comprising instructions that, when executed, cause a programmable processor to receive first data representative of conditions during a first braking event of an aircraft; generate a first cost value corresponding to the first braking event based on the first data, wherein the first cost value is based on an expected wear on a wheel-and-brake assembly of the aircraft during the first braking event; receive second data representative of conditions during a second braking event of the aircraft; and generate a second cost value corresponding to the second braking event based on the second data, wherein the second cost value is based on an expected wear on the wheel-and-brake assembly of the aircraft during the second braking event.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages of the disclosure will be apparent from the description and drawings, and from the claims.

DETAILED DESCRIPTION

Figure 1:
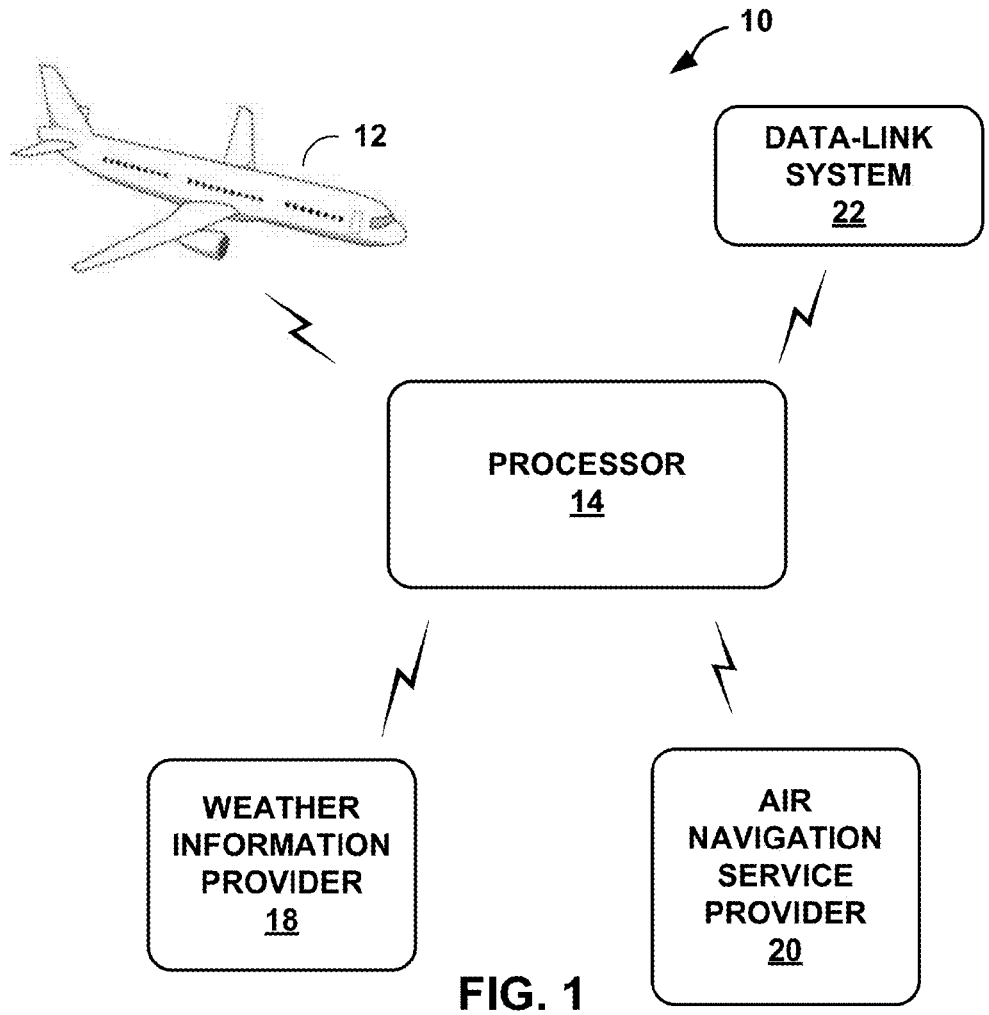
FIG. 1 is a schematic diagram illustrating a system configured to generate cost-per-braking event values for an aircraft.

A wheel-and-brake assembly of an aircraft may experience wear during a braking event (e.g., a landing) of the aircraft. In the examples described herein, a braking event may include any time during which a brake assembly of the aircraft is in use, such as during touchdown, taxiing, parking, emergency usage (e.g., a rejected takeoff), engine run-up, and the like. Each braking event may be defined by a particular brake usage situation, such as a particular landing of the aircraft, a particular taxiing event of the aircraft, a particular takeoff of the aircraft, or the like. During a braking event such as a landing, the aircraft brakes of the wheel-and-brake assembly are used to slow the aircraft upon (e.g., immediately after) touchdown of the aircraft on a runway or other landing surface. In addition, during the landing, brake assembly may be used to control the speed of the aircraft during maneuvers of the aircraft on the ground associated with the landing (e.g., taxiing). Example ground maneuvers associated with the landing can include, for example, traveling from the runway to a terminal after touchdown or vice versa prior to take-off. In a rejected takeoff event, the aircraft may stop short during a takeoff run and does not takeoff, and, as a result, the brake assembly may be used to slow the aircraft from takeoff speeds to taxi speed during the rejected takeoff. An engine run-up event may occur in preparation for take-off or at other times. In an engine run-up event, the aircraft is held stationary by the brake force applied by the brake assembly as the engines of the aircraft are brought to increased (e.g., maximum) thrust.

Various factors may affect the amount of wear on an aircraft brake assembly during a braking event and, therefore, the actual cost of brake usage. For example, the actual duration of brake usage during the braking event, the external weather, runway conditions, utilization of the thrust reverser (or other aerodynamic functions), settings of flight control surfaces, approach speeds, taxi distances, and the operating temperature of the brake disc stack during the braking event may affect the actual amount of wear on an aircraft brake assembly during the braking event. The actual duration of brake usage may depend on various factors, such as, for example, length of the runway, amount of brake pressure applied, temperatures of the brake assembly, aircraft weight, speed of landing, taxi time and distance, differential usage of the brakes (e.g., for steering or other aircraft control), duration with which the aircraft brakes are applied after coming to a stop and prior to the engagement of a parking brake, and abnormal operation of the brake (e.g., emergency stopping). The external weather may affect the wear of the brake assembly because, for example, higher external temperatures may increase the rate of wear on the brake discs of the brake assembly, weather conditions may result in a different landing path, or factors such as snow or rainwater on the airport surfaces may modify the landing surface. In addition, actual brake usage and wear may depend on whether or not aerodynamic, thrust reverser, or other similar functions are used during a particular braking event to help slow the aircraft speed.

A wheel-and-brake assembly of an aircraft has a limited useable life, as determined through wear, and may have an associated operating and maintenance cost that is based on the actual use of the brake assembly and how fast the life of the brake assembly is consumed. In some cases, wheel-and-brake assembly manufacturers and customers may establish brake maintenance agreements that define a flat cost-per-braking event to be billed to the customer for maintenance of the assembly. In this way, brake operation costs may be monetized on an aggregate basis, e.g., a generalized cost per braking event fee applied universally to the brake operation.

The flat cost-per-braking event value (also referred to herein as a "cost-per-braking event fee") may be determined and negotiated based on rough general customer information. However, because the flat cost-per-braking event value is a fixed value applied to all braking events of the aircraft, the flat cost-per-braking event value may not be directly correlated to wear and tear on the wheel-and-brake assembly or to the exact amount of brake usage during a particular braking event of a particular aircraft. Not all braking events are the same and not all braking events result in the same amount of brake wear. Thus, the actual amount of wear on the wheel-and-brake assembly during a particular braking event may not be accurately correlated to the flat cost-per-braking event fee and, for each braking event of the aircraft, the cost to either the customer or the manufacturer may not accurately reflect the amount of required maintenance. For example, for a relatively abrasive or difficult landing, or for relatively long taxi distances with cold brakes (e.g., excessive wear may occur during colder brake temperatures, such as during taxiing of the aircraft), the flat cost-per-braking event value may be lower than the cost of maintenance to the assembly (e.g., replacement cost for one or more brake discs) attributable to the braking event, such that the manufacturer may realize a loss on the transaction. Similarly, for a relatively easy landing or relatively short taxi distance that may not result in as much wear on the brake assembly as a more difficult braking event, the flat cost-per-braking event value may be higher than the cost of maintenance required on the assembly attributable to the braking event, such that the customer may realize a loss on the transaction.

The examples herein describe systems and techniques for generating a plurality of cost values for braking events of an aircraft, where each of the plurality of cost values is based on an expected wear of a wheel-and-brake assembly during a respective braking event of the aircraft. Information or data from various existing sources, such as systems of the aircraft itself (e.g., a flight management system (FMS), a global positioning system (GPS), an inertial reference system (IRS), an Avionics system, flight control positions, thrust reverser utilization, and the like), brake sensors (e.g., temperature or pressure sensors), data-link systems, external weather forecasting information, airport taxi diagrams, gate information, and other external data, may be aggregated and used to determine an expected wear (e.g., an expected amount of brake usage) on the wheel-and-brake assembly during a braking event and to determine a cost value for the braking event based on the expected wear.

The cost-per-braking event value determination described in this disclosure results in a cost-per-braking event that is variable and based on conditions surrounding the aircraft braking event. Thus, the variable cost-per-braking event value determination may be used to more directly tie a cost-per-braking event fee charged by an entity to actual brake usage, particularly when compared to a flat cost-per-braking event model. The entity may then use the variable cost-per-braking event value determination to bill a customer for aircraft braking events. In some examples, the cost-per-braking event value may be transmitted (e.g., to the customer) electronically in order to provide real-time brake usage data and billing.

In contrast to the cost-per-braking event value, the systems and techniques described herein generate a cost value that is based on actual usage of the brake, where the cost generation is based on internal (to the aircraft) and external (to the aircraft) data. This innovation combines data sources and provides a determination of actual usage to derive an innovative business process.

FIG. 1 is a schematic diagram illustrating an example system 10 configured to determine cost-per-braking event values for example aircraft 12. System 10 includes processor 14, aircraft 12, and sources of data representative of conditions during a braking event (e.g., a landing) of aircraft 12, such as weather information provider 18, air navigation service provider 20, and data-link system 22. The data sources illustrated in FIG. 1 are only examples of sources that may provide information representative of conditions during a braking event of aircraft 12. In other examples, any suitable source of information representative of conditions during a braking event of aircraft 12 may provide such information to processor 14 to be used by processor 14 in the generation of cost values corresponding to braking events of aircraft 12.

A braking event occurs when a brake assembly of aircraft 12 is used to slow wheels of aircraft 12 when aircraft 12 is on the ground. In some examples described herein, a braking event of aircraft 12 may include a period of time prior to touchdown of aircraft 12, touchdown of aircraft 12, and taxiing of aircraft 12 after touchdown to a gate or another destination. For example, the braking event may begin with the touchdown of aircraft 12 and end upon engagement of a parking brake at a gate or another destination. As another example, the braking event may include a period of time prior to take-off of aircraft 12. For example, the braking event may begin with the release of a parking brake (e.g., at a gate of an airport) and end at take-off of aircraft 12, or, with the re-engagement of the parking brake (e.g., in the case of a rejected takeoff situation).

A pilot or other operator may activate a brake assembly more than once during a particular landing, taxi, takeoff, or other usage involving a ground maneuver. In some examples, a braking event is defined by a cluster of brake assembly activations (e.g., each time a pilot compresses the brake pedal to actuate the brakes to slow aircraft 12), where the cluster includes brake assembly usages within a particular range of time of each other (e.g., within less than 10 minutes of each other). The cluster can include one or more brake assembly usages. The range of time may be selected to be inclusive of brake assembly usages during the same brake usage situations (e.g., during the same landing or takeoff).

Processor 14 may be any processor suitable for generating a plurality of cost values, each of which corresponds to a respective braking event of aircraft 12. For example, processor 14 may include any one or more of a microprocessor, a controller, a digital signal processor (DSP), an application specific integrated circuit (ASIC), a field-programmable gate array (FPGA), discrete logic circuitry, and the functions attributed to processor 14 may be embodied as firmware, hardware, software or any combination thereof. In some examples, processor 14 may be located within a device such as a notebook computer, tablet computer, workstation, cellular phone, personal digital assistant or another computing device. Processor 14 may include one or more processors aboard aircraft 12 and/or may include one or more processors at a ground location.

Processor 14, or a device within which processor 14 is located, is configured to receive data representative of conditions during a plurality of braking events of aircraft 12. Processor 14, or a device within which processor 14 is located, may receive data from data sources such as aircraft 12 itself, weather information provider 18, air navigation service provider 20, data-link system 22, or any other suitable data source via any suitable communication technique. For example, processor 14, or a device within which processor 14 is located, may receive data or information via wireless communication using radio frequency (RF) telemetry techniques, any of a variety of local wireless communication techniques, such as RF communication according to the 802.11 or Bluetooth specification sets, infrared (IR) communication according to the IRDA specification set, very high frequency (VHF) data radios, Satellite Communications, Aircraft Communications and Reporting System (ACARS), or other standard or proprietary telemetry protocols. Processor 14, or a device within which processor 14 is located, may also receive data or information via any suitable wired connection. In some examples, processor 14, or a device within which processor 14 is located, can receive data or information from computing devices or other devices via exchange of removable media, such as magnetic or optical disks, memory cards or memory sticks, or via remote telemetry techniques known in the art, such as a local area network (LAN), wide area network (WAN), public switched telephone network (PSTN), or cellular telephone network, for example. Processor 14, or a device within which processor 14 is located, may also be configured to receive data or information via a satellite or air-to-ground communication technique.

As illustrated in FIG. 1, processor 14 may receive data representative of conditions during a braking event of aircraft 12 from aircraft 12 itself. For example, aircraft systems of aircraft 12 may monitor and store a variety of different types of data that may be useful for characterizing conditions during a braking event of aircraft 12 and, in turn, generating a cost value associated with the braking event.

As an example, aircraft systems of aircraft 12, such as a global positioning system (GPS) or an inertial reference system (IRS), may be configured to monitor and record position data of aircraft 12. Processor 14 may utilize position data of aircraft 12 to determine a variety of types of data that may impact the expected wear on a wheel-and-brake assembly of aircraft 12 during braking event. For example, processor 14 may utilize position data to determine the airport at which aircraft 12 landed during a particular braking event, characterize the taxi time and taxi route of aircraft 12 during a particular braking event, or both. In some examples, a taxiing period following touchdown may require a substantial amount of brake usage and, thus, the wheel-and-brake assembly may be expected to sustain a relatively large amount of wear during the taxiing period. By using position data, e.g., received from aircraft 12, processor 14 may characterize the time and/or route of the taxiing period and utilize this data to generate a cost value for the braking event that is at least partially determined based on an expected wear of the wheel-and-brake assembly. Processor 14 may also receive position data of aircraft 12 to determine the surface upon which aircraft 12 touches down, which may be indicative of the type of material upon which aircraft 12 touches down, the condition of the surface upon which aircraft 12 touches down, etc., all of which may be expected to affect wear on the wheel-and-brake assembly.

As another example, aircraft systems of aircraft 12 may monitor and record whether the thrust reverser of aircraft 12 was engaged during a braking event (e.g., a landing) of aircraft 12 to slow aircraft 12. Engagement of the thrust reverser to slow the speed of aircraft 12 during a braking event may indicate that brake usage during the braking event was less than if the thrust reverser was not engaged during the braking event. Thus, for braking events in which the thrust reverser is engaged and data from aircraft 12 indicates such, processor 14 may determine that an expected wear on the wheel-and-brake assembly of aircraft 12 is relatively less than for braking events in which the thrust reverser is not engaged. Conversely, for braking events in which the thrust reverser is not engaged and data from aircraft 12 indicates such, processor 14 may determine that an expected wear on the wheel-and-brake assembly is relatively more than for braking events in which the thrust reverser is engaged. Processor 14 may use this data as one of a number of bases for generating a cost value for the braking event.

As another example, aircraft systems of aircraft 12, such a flight management system (FMS), may monitor and record data indicative of the speed and/or velocity of aircraft 12 throughout the flight and a particular braking event of aircraft 12. The FMS may also determine how fast aircraft 12 slowed down after touchdown on a landing surface, i.e., the rate of slow down. In some examples, aircraft 12 approaching a landing surface at a relatively high speed or velocity or moving at a relatively high speed or velocity immediately after touchdown on a landing surface may result in relatively more wear on the wheel-and-brake assembly compared to braking events in which aircraft 12 approaches a landing surface at a relatively lower speed or velocity or moves at a relatively lower speed or velocity immediately after touchdown. Therefore, in some examples, processor 14 may receive data indicative of speed and/or velocity of aircraft 12 from aircraft 12, the rate of aircraft 12 slow down after touchdown, and the like, and may utilize the data as at least one basis for generating a cost value for the braking event.

The FMS of aircraft 12 or a source of information external to aircraft 12 (as described below with respect to air navigation service provider 20) may also provide, to processor 14, information regarding the geographic location of the braking event. For example, the FMS may provide information that identifies the runway on which aircraft 12 landed, the point on the landing surface at which aircraft 12 touched down, and the taxi route. Processor 14 may then use this information regarding the geographic location of the braking event of aircraft 12 to determine a cost value associated with the braking event expected wear on a wheel-and-brake assembly of aircraft 12 during the braking event. Processor 14 may, for example, access a database that includes a plurality of airport maps in order to determine the taxi distance based on the taxi route from a particular runway to a particular gate.

The runway on which aircraft 12 landed, the point on the landing surface at which aircraft 12 touched down, the gate to which the aircraft taxis, or any combination thereof, may indicate the distance over which aircraft 12 slowed down upon touchdown, which may indicate the extent of wear. For example, a shorter runway in combination with a particular aircraft speed at touchdown may result in more expected wear to a brake assembly of aircraft 12 than a longer runway in combination with the same aircraft speed or a lower aircraft speed at touchdown. In addition, the taxi route and taxi time of aircraft 12 during the braking event, which may be indicative of an expected wear on a wheel-and-brake assembly of aircraft 12 during the braking event because aircraft brakes may experience wear during taxiing.

Processor 14 may also be configured to receive data from a brake sensor, which may be a component of aircraft 12. The brake sensor may measure brake wear, remaining brake life (e.g., based on the thickness of the brake discs), temperature of the brake, and other physical properties of the brake assembly.

The brake sensor may generate information indicative of characteristics of one or more brake discs of the wheel-and-brake assembly during a braking event of aircraft 12. For example, the brake sensor may be positioned proximate to the one or more brake discs and configured to measure and monitor a temperature of the one or more brake discs. Temperature of the one or more brake discs may be relevant to an expected wear of the brake disc because, for example, a relatively high temperature (e.g., caused by relatively high forces during braking) may degrade the brake disc more rapidly than a relatively lower temperature. The brake sensor may transmit the temperature information to processor 14, and processor 14 may be configured to receive the temperature information and utilize the information to generate a cost value for the braking event.

The brake sensor may, alternatively or additionally, be configured to measure and monitor a pressure applied to the brake disc during the braking event. As with temperature, pressure applied to the brake disc may be relevant to an expected wear of the brake disc because, for example, a relatively larger amount of applied pressure (e.g., caused by relatively high forces during braking) may degrade or wear the brake disc more rapidly than a relatively smaller amount of applied pressure. The brake sensor may transmit the applied pressure information to processor 14, and processor 14 may be configured to receive the pressure information and utilize the information to generate a cost value for the braking event.

Although several specific examples of types of data monitored and recorded by aircraft 12 have been described, processor 14 may be configured to receive any type of data from aircraft 12 that may be relevant to generating a cost value that is based on an expected wear of a wheel-and-brake assembly of aircraft 12 during a particular braking event of aircraft 12. For example, processor 14 may receive and analyze additional internal and external data, operational characteristics, brake wear models, brake type and composition information, and additional data related to brake usage and brake life. The brake wear models and brake type and composition information may include, for example, estimated brake wear (e.g., based on the decreased thickness of the brake discs) for a plurality of different braking event (e.g., aborted take-off or taxiing) types.

As illustrated in FIG. 1, processor 14 may also be configured to receive data from weather information provider 18. Weather information provider 18 may be any suitable source of weather information representative or predictive of weather during a braking event of aircraft 12. For example, weather information provider 18 may be an organization or resource such as the National Weather Service.

Weather information may be relevant to an expected wear of a wheel-and-brake assembly because, for example, relatively greater or lesser braking force may be required in different weather conditions. For example, during rainy or snowy weather conditions, relatively more braking force may be required to slow and stop aircraft 12 than in clear conditions, e.g., without precipitation, which may result in additional expected wear on the wheel-and-brake assembly. As another example, weather information may indicative of the use of chemicals, such as de-icing chemicals in cold, snowy, and/or icy conditions, which can degrade components of the wheel-and-brake assembly more quickly than if the chemicals were not used, resulting in additional expected wear on the wheel-and-brake assembly.

In addition, or instead, weather information may be relevant to an expected wear of a wheel-and-brake assembly because, for example, a higher environmental temperature may result in a higher brake operating temperature, which may result in additional expected wear on the wheel-and-brake assembly.

As illustrated in FIG. 1, processor 14 may also be configured to receive data from air navigation service provider (ANSP) 20, which may be any suitable organization that manages flight traffic on behalf of a company, region, or country. For example, in the United States of America, ANSP 20 may be the Federal Aviation Administration (FAA).

ANSP 20 may provide data to processor 14 that is indicative of conditions during the braking event of aircraft 12. For example, ANSP 20 may provide information about the taxi route and taxi time of aircraft 12 during the braking event, which may be indicative of an expected wear on a wheel-and-brake assembly of aircraft 12 during the braking event, as discussed above. As another example, ANSP 20 may provide gate information (e.g., gate location, distance from a particular runway to the gate, and the like) to processor 14.

As illustrated in FIG. 1, processor 14 may also be configured to receive data from data-link system 22. In some examples, data-link system 22 may be a telecommunication system used to send information between an aircraft, e.g., aircraft 12, and air traffic controllers. Data-link system 22 may include any system suitable for transmitting data from aircraft 12 (e.g., any wireless, infrared, or physical connection for removal of data). The data transmitted by data-link system 22 may include any of the data described herein, such as data captured from systems or sensors of aircraft 12. Data-link system 22 may, in some examples, transmit data such as landing speed, GPS position, brake temperature, flight plan, taxi plan, thrust reverser usage, and the like, from aircraft 12. In addition, in some examples, data regarding operational costs (e.g., thrust reverser costs), may be transmitted by data-link 22 to aircraft 12. As another example, cost calculations may be performed off board aircraft 12 and subsequently transmitted to aircraft 12 by data-link system 22.

Although several example sources of data are described with respect to FIG. 1, processor 14 is configured to receive data from any suitable source. In particular, processor 14 is configured to receive data representative of conditions during a braking event of aircraft 12, which processor 14 can subsequently utilize in generation of particular cost values that correspond to particular braking events of aircraft 12.

Figure 2:
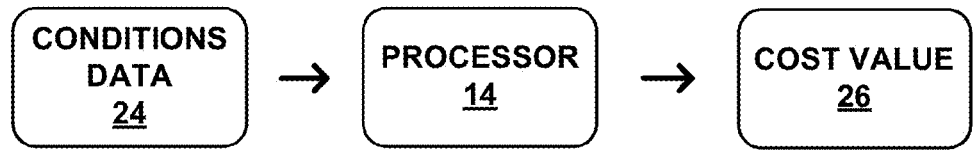
FIG. 2 is a schematic block diagram illustrating generation of a cost value that corresponds to a particular braking event of an aircraft, where the cost value is based on an expected wear on a wheel-and-brake assembly of the aircraft during the particular braking event.

FIG. 2 is a schematic block diagram illustrating generation, by processor 14, of a cost value that corresponds to a particular braking event of aircraft 12, where the cost value is based on an expected wear on a wheel-and-brake assembly of aircraft 12 during the particular braking event. As illustrated in FIG. 2, conditions data 24 is input into processor 14. In other words, processor 14 receives conditions data 24. Conditions data 24 may be any data representative of conditions during the particular braking event of aircraft 12. For example, conditions data 24 may be data generated or supplied by any of aircraft 12, weather information provider 18, air navigation service provider 20, or data-link system 22, as illustrated in FIG. 1, or data from any other suitable source of data representative of conditions during the particular braking event of aircraft 12.

Processor 14, based on the input of conditions data 24, is configured to generate cost value 26, which corresponds to the particular braking event of aircraft 12 and is based on an expected wear on a wheel-and-brake assembly of aircraft 12 during the particular braking event. Processor 14 may, in order to generate cost value 26, execute a particular algorithm that takes into account some or all of conditions data 24 to generate or output cost value 26. The cost value generated by processor 14 is specific to the particular braking event of aircraft 12 because it is based on the specific conditions associated with the particular braking event, rather than conditions estimated well in advance of the braking event and general to a plurality of expected braking events of aircraft 12 as in flat cost-per-braking event models. In this way, at least two braking events of aircraft 12 may be associated with different cost values.

The techniques described herein can facilitate any suitable billing schedule of a wheel-and-brake assembly customer. For example, in some examples, upon generating a single cost value associated with a particular braking event, a customer may be billed in real-time, e.g., immediately. In other examples, a customer may be billed according to a different schedule. For example, the customer may be billed daily for the cost values associated with all braking events that occurred in a particular day, weekly for the cost values associated with all braking events that occurred in a particular week, monthly for all cost values associated with braking events that occurred in a particular month, etc.

Figure 3:
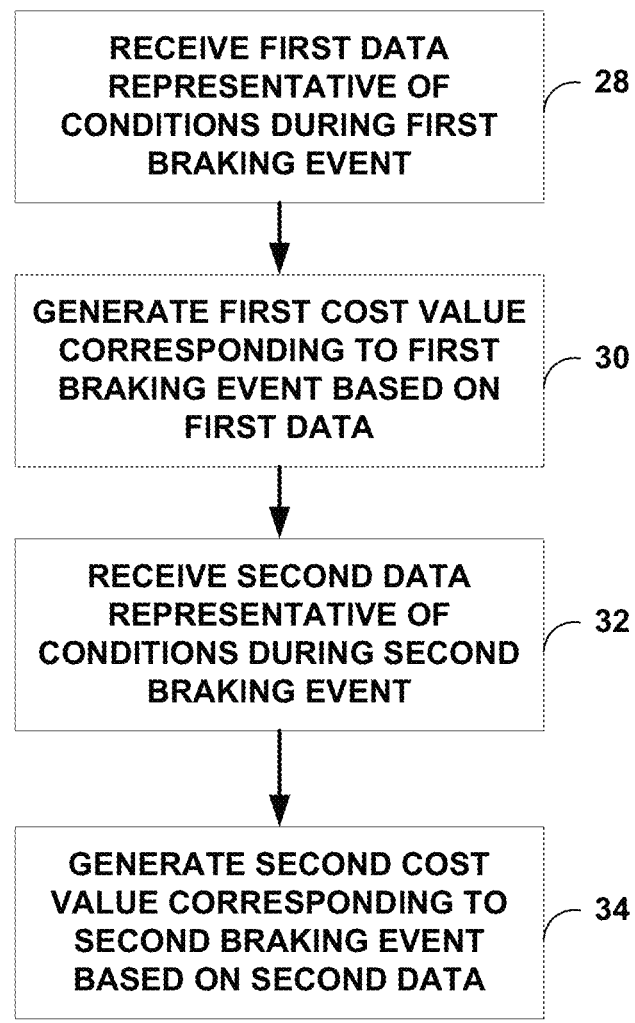
FIG. 3 is a flow diagram illustrating an example technique for generating a plurality of cost values, each of which corresponds to one of a plurality of braking events of an aircraft and each of which is based on an expected wear on a wheel-and-brake assembly of the aircraft during the respective braking event of the plurality of braking events.

FIG. 3 is a flow diagram illustrating an example technique for generating a plurality of cost values, each of which corresponds to one braking event of a plurality of braking events of aircraft 12 and each of which is based on an expected wear on a wheel-and-brake assembly of aircraft 12 during the respective braking event of the plurality of braking events. In the example technique illustrated in FIG. 3, processor 14 receives first data representative of conditions during a first braking event of aircraft 12 (28), and generates a first cost value corresponding to the first braking event based on the first data (30). In the example technique illustrated in FIG. 3, processor 14 subsequently receives second data representative of conditions during a second braking event of aircraft 12 (32), and generates a second cost value corresponding to the second braking event based on the second data (34). Processor 14 may determine additional cost values for additional braking events in a similar manner. As discussed herein, the cost values may be based on an expected wear on a wheel-and-brake assembly of the aircraft during a respective braking event. For example, in the example technique illustrated in FIG. 3, the first cost value is based on an expected wear on a wheel-and-brake assembly of aircraft 12 during the first braking event and the second cost value is based on an expected wear on the wheel-and-brake assembly during the second braking event.

The first and second data received by processor 14 may include conditions data transmitted from one or more of the example sources illustrated in FIG. 1 (e.g., aircraft 12, weather information provider 18, air navigation service provider 20, or data-link system 22). Alternatively or additionally, the first and second data may include conditions data transmitted from another suitable source.

Processor 14 may generate the first and second cost values according to any suitable technique. In some examples, processor 14 may receive the first and second data as inputs for a predetermined algorithm, and output the first and second cost values, respectively, by executing the algorithm.

As one example, processor 14 may assign weights to particular types of conditions data based on the expected wear associated with a respective type of conditions data. For example, a particular type of conditions data that is expected to result in relatively more wear on the wheel-and-brake assembly of aircraft 12 during a braking event may be weighted higher than a different type of conditions data that is expected to cause relatively less wear on the wheel-and-brake assembly. The algorithm executed by processor 14 may specify that types of conditions data that are weighted relatively higher may affect the generated cost value of a particular braking event more than types of conditions data that are rated relatively lower. For example, the pressure applied to a brake disc of the wheel-and-brake assembly during a braking event may be expected to affect the wear on the wheel-and-brake assembly during the braking event more than the location of touchdown of the aircraft 12 during the braking event. Thus, the algorithm executed by processor 14 may weight conditions data that represents the pressure applied to a brake disc of the wheel-and-brake assembly during the braking event, e.g., as measured by a brake sensor of aircraft 12, higher than conditions data that represents the location of touchdown of aircraft 12 during the braking event, e.g., as determined by a GPS onboard aircraft 12. Processor 14, after executing the algorithm, may generate a cost value that is affected relatively more by the conditions data that represents the pressure applied to the brake disc than by the conditions data that represents the location of touchdown of aircraft 12.

As an example, use of cold brakes during a braking event that includes a relatively large taxiing period may result in relatively large amount of actual brake usage. Thus, in some examples, processor 14 may determine the cost value for the braking event by executing an algorithm that weights taxi time, taxi distance, temperature of the brake disc, and internal or external factors of a long taxi distance with many stops more heavily than other factors that may affect actual brake usage.

The algorithm implemented by processor 14 to determine the cost value based on brake usage conditions and other data may vary based on the type of brake assembly (e.g., carbon-carbon brakes or ceramic brakes), the aircraft type (e.g., the weight of the aircraft), and the like. In this way, processor 14 may implement the algorithm to model actual utilization of the brake assembly.

Figure 4:
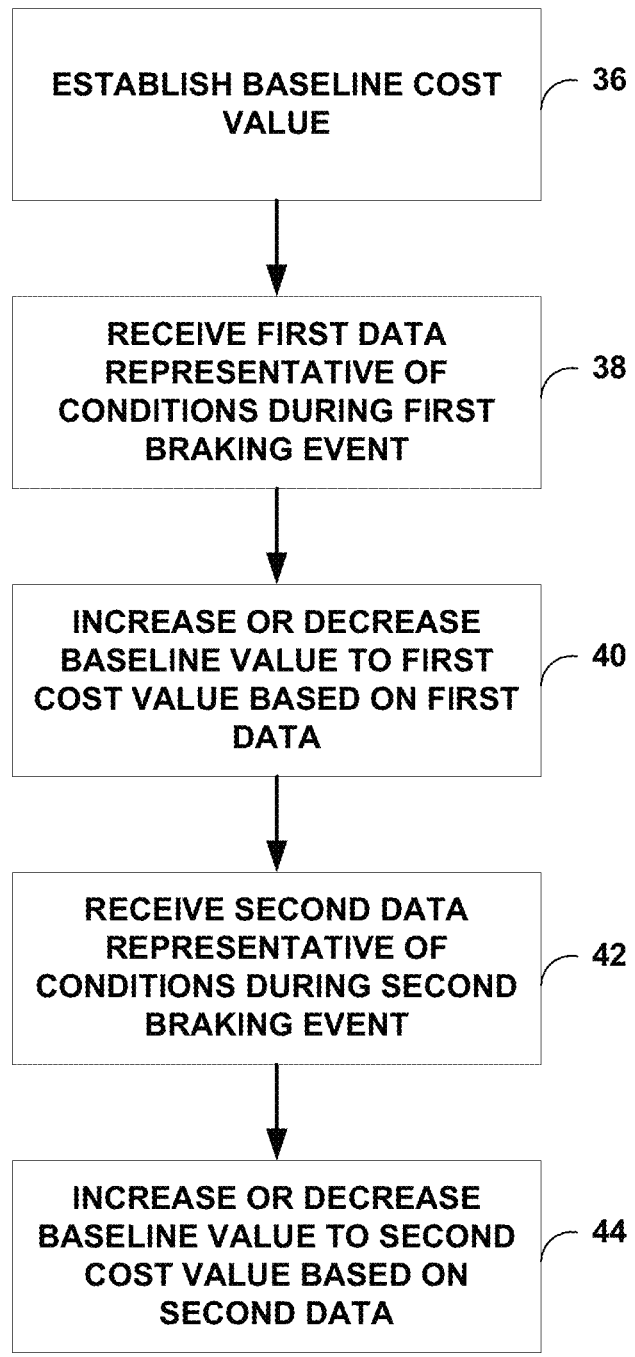
FIG. 4 is a flow diagram illustrating one example technique for generating cost-per-braking event values for an aircraft, which includes increasing or decreasing a baseline cost value based on conditions data.

FIG. 4 is a flow diagram illustrating one example technique that processor 14 may use to generate the first and second cost values described with respect to FIG. 3 above. In general, the example technique illustrated in FIG. 4 includes establishing a baseline cost value and increasing or decreasing the baseline cost value based on conditions data representative of conditions during the first braking event and the second braking event to generate the first and second cost values, respectively. The example technique illustrated in FIG. 4 represents only one example technique for generating the first and second (and additional, in some examples) cost values. In other examples, processor 14 may utilize another suitable technique for generating the first and second cost values based on the conditions data.

As illustrated in FIG. 4, processor 14 may establish a baseline cost value (36). In some examples, processor 14 may establish the baseline cost value by accessing a predetermined baseline cost value. For example, the baseline cost value may be predetermined based on a number of factors, such as the particular type of aircraft 12, the particular airport at which the braking event of aircraft 12 is taking place, the particular runway of the airport being used for the braking event, the estimated number of braking events of aircraft 12, and any other suitable factor. In some examples, the baseline cost value may be negotiated between a manufacturer, e.g., of the wheel-and-brake assembly of aircraft 12, and a customer, and may be predetermined in this manner.

In accordance with the technique shown in FIG. 4, processor 14 receives first data representative of conditions during a first braking event (38), as described above with respect to FIG. 3. Upon receiving the first data, processor 14 generates the first cost value by increasing or decreasing the baseline cost value to the first cost value based on the first data (40). Similarly, processor 14 receives second data representative of conditions during a second braking event (42), as described above with respect to FIG. 3 and, upon receiving the second data, processor 14 generates the second cost value by increasing or decreasing the baseline cost value to the second cost value based on the second data (44).

Processor 14 may increase or decrease the baseline cost value to generate the first cost value and the second cost value in any suitable manner, e.g., using any suitable algorithm. Processor 14 may increase or decrease the baseline cost value by any suitable unit of the baseline cost value, such as a dollar or other monetary unit. In some examples, a particular value of a particular type of conditions data may correspond to a particular increase or decrease of the baseline cost value, e.g., based on one or more factors. For example, a particular type of conditions data may be weighted more or less than other types of conditions data as discussed above, e.g., based on an expected wear of the wheel-and-brake assembly resulting from the particular condition represented by the particular type of conditions data. Processor 14 may increase or decrease the baseline cost value proportionally to the weight of the particular type of conditions data. As another example, processor 14 may increase or decrease the baseline cost value proportionally to a particular value or metric of the conditions data. That is, processor 14 may increase the baseline cost value more for a higher value of a particular type of conditions data than for a lower value of the same type of conditions data. For example, for temperature and/or pressure data, e.g., received from a brake sensor of aircraft 12, processor 14 may increase the baseline cost more for data that indicates a relatively higher pressure and/or temperature than for data that indicates a relatively lower temperature and/or pressure. In this way, processor 14 may generate first, second, and additional cost values based on an expected wear of a wheel-and-brake assembly during a particular braking event.

In some examples, the techniques described herein may be used prior to an actual braking event (e.g., landing) to provide an operator or pilot of aircraft 12 with data indicative of the cost of more than one braking event options, which may allow the operator or pilot to select the most cost-effective method of a safe braking event. For example, an operator or pilot may have the option of utilizing the thrust reverser of aircraft 12 to slow aircraft 12 or, instead, utilizing the brakes of aircraft 12 to slow aircraft 12. Utilization of the thrust reverser may have a first set of associated costs (e.g., engine maintenance costs, fuel costs, etc.), while utilization of the brakes of aircraft 12 may have a second set of associated costs. Processor 14 may be configured to analyze the conditions associated with the future braking event and present (e.g., via a display of a user interface) the operator or pilot with a first cost value associated with the braking event if the thrust reverser were used and a second cost value associated with the braking event if the brakes were used. In this way, the techniques described herein may be used to provide options for selection of a cost-effective braking event technique, which may be used to manage the cost of a particular braking event.

Various examples have been described. These and other examples are within the scope of the following claims.

What is claimed is:

1. A method for generating cost-per-braking event values, the method comprising:
   receiving, with a processor, first aircraft data representative of conditions of an aircraft during a first braking event of the aircraft and first external data representative of conditions external to the aircraft during the first braking event, wherein the first aircraft data is generated by at least one sensor of the aircraft;
   generating, with the processor, a first cost value corresponding to the first braking event based on the first aircraft data and the first external data, wherein the first cost value is based on an expected wear on a wheel-and-brake assembly of the aircraft during the first braking event wherein generating the first cost value comprises:
      determining, with the processor, a first change in a stored predetermined baseline cost value, wherein the first change is proportional to a value of the first aircraft data;
      determining, with the processor, a second change in the predetermined baseline cost value, wherein the second change is proportional to a value of the first external data; and
      determining, with the processor, a first total change in the predetermined baseline cost value based on the first change and the second change;
   receiving, with the processor, second aircraft data representative of conditions of the aircraft during a second braking event of the aircraft and second external data representative of conditions external to the aircraft during the second braking event, wherein the second aircraft data is generated by the at least one sensor of the aircraft; and
   generating, with the processor, a second cost value corresponding to the second braking event based on the second aircraft data and second external data, wherein the second cost value is based on an expected wear on the wheel-and-brake assembly of the aircraft during the second braking event, wherein generating the second cost value comprises:
      determining, with the processor, a third change in the predetermined baseline cost value, wherein the third change is proportional to a value of the second aircraft data;
      determining, with the processor, a fourth change in the predetermined baseline value, wherein the fourth change is proportional to a value of the second external data;
      determining, with the processor, a second total change in the predetermined baseline value based on the third change and the fourth change.

2. The method of claim 1, wherein receiving the first aircraft data or the second aircraft data comprises receiving data representative of a position of the aircraft from at least one of a global position system (GPS) of the aircraft or an inertial reference system (IRS) of the aircraft.

3. The method of claim 1, wherein receiving the first aircraft data or the second aircraft data comprises receiving data indicative of a speed of aircraft upon touchdown from a flight management system (FMS) of the aircraft.

4. The method of claim 1, wherein at least one of receiving the first aircraft data or receiving the second aircraft data comprises receiving data from a brake sensor positioned proximate to a brake disc of the wheel-and-brake assembly, wherein the data from the brake sensor is representative of at least one of a temperature of or a pressure applied to the brake disc.

5. The method of claim 1, wherein at least one of receiving the first aircraft data or receiving the second aircraft data comprises receiving data from the aircraft via a data-link system.

6. The method of claim 1, wherein at least one of receiving the first external data or receiving the second external data comprises receiving data indicative of external weather conditions during the braking event from a weather information provider.

7. The method of claim 1, wherein at least one of receiving the first external data or receiving the second external data comprises receiving data indicative of at least one of a taxi time of the aircraft during the first braking event or the second braking event, respectively, or a taxi route of the aircraft during the first braking event or the second braking event, respectively.

8. The method of claim 1, wherein generating the first cost value comprises increasing or decreasing the predetermined baseline cost value by the first total change in the predetermined baseline cost value to the first cost value, and wherein generating the second cost value comprises increasing or decreasing the predetermined baseline cost value by the second total change in the predetermined baseline cost value to the second cost value.

9. A system configured to generate cost-per-braking event values, the system comprising:
   a processor configured to receive first aircraft data representative of conditions of an aircraft during a first braking event of the aircraft and first external data representative of conditions external to the aircraft during the first braking event, wherein the first aircraft data is generated by at least one sensor of the aircraft,
   generate a first cost value corresponding to the first braking event based on the first aircraft data and the first external data by at least:
      determining a first change in a stored predetermined baseline cost value, wherein the first change is proportional to a value of the first aircraft data,
      determining a second change in the predetermined baseline cost value, wherein the second change is proportional to a value of the first external data, and
      determining a first total change in the predetermined baseline cost value based on the first change and the second change,
   receive second aircraft data representative of conditions of the aircraft during a second braking event of the aircraft and second external data representative of conditions external to the aircraft during the second braking event, wherein the second aircraft data is generated by at least one sensor of the aircraft, and
   generate a second cost value corresponding to the second braking event based on the second aircraft data and second external data by at least:

determining a third change in the predetermined baseline cost value, wherein the third change is proportional to a value of the second aircraft data, determining a fourth change in the predetermined baseline value, wherein the fourth change is proportional to a value of the second external data, and determining a second total change in the predetermined baseline value based on the third change and the fourth change, wherein the first cost value is based on an expected wear on a wheel-and-brake assembly of the aircraft during the first braking event and the second cost value is based on an expected wear on the wheel-and-brake assembly of the aircraft during the second braking event.

10. The system of claim 9, wherein the processor is configured to receive at least one of the first aircraft data or the second aircraft data by at least receiving data from a brake sensor positioned proximate to a brake disc of the wheel-and-brake assembly, wherein the data from the brake sensor is representative of at least one of a temperature of or a pressure applied to the brake disc.

11. The system of claim 9, wherein the processor is configured to receive at least one of the first aircraft data or the second aircraft data by at least receiving data from the aircraft via a data-link system.

12. The system of claim 9, wherein the processor is configured to receive at least one of the first external data or the second external data by at least receiving data indicative of external weather conditions during the braking event from a weather information provider.

13. The system of claim 9, wherein the processor is configured to receive at least one of the first external data or the second external data by at least receiving data indicative of at least one of a taxi time of the aircraft during the first braking event or the second braking event, respectively, or a taxi route of the aircraft during the first braking event or the second braking event, respectively.

14. The system of claim 9, wherein the processor is configured to generate the first cost value by at least increasing or decreasing the predetermined baseline cost value by the first total change in the predetermined baseline cost value to the first cost value, and wherein generating the second cost value comprises increasing or decreasing the predetermined baseline cost value by the second total change in the predetermined baseline cost value to the second cost value.

15. A non-transitory computer-readable medium comprising instructions that, when executed, cause a programmable processor to:

receive first aircraft data representative of conditions of an aircraft during a first braking event of the aircraft and first external data representative of conditions external to the aircraft during the first braking event, wherein the first aircraft data is generated by at least one sensor of the aircraft;

generate a first cost value corresponding to the first braking event based on the first aircraft data and the first external data, wherein the first cost value is based on an expected wear on a wheel-and-brake assembly of the aircraft during the first braking event, wherein the instructions cause the programmable processor to generate the first cost value by causing the programmable processor to:

determine a first change in a stored predetermined baseline cost value, wherein the first change is proportional to a value of the first aircraft data;

determine a second change in the predetermined baseline cost value, wherein the second change is proportional to a value of the first external data; and determine a first total change in the predetermined baseline cost value based on the first change and the second change;

receive second aircraft data representative of conditions of the aircraft during a second braking event of the aircraft and second external data representative of conditions external to the aircraft during the second braking event, wherein the second aircraft data is generated by at least one sensor of the aircraft data; and generate a second cost value corresponding to the second braking event based on the second aircraft data and second external data, wherein the second cost value is based on an expected wear on the wheel-and-brake assembly of the aircraft during the second braking event wherein the instructions cause the programmable processor to generate the first cost value by causing the programmable processor to:

determine a third change in the predetermined baseline cost value, wherein the third change is proportional to a value of the second aircraft data;

determine a fourth change in the predetermined baseline value, wherein the fourth change is proportional to a value of the second external data;

determine a second total change in the predetermined baseline value based on the third change and the fourth change.

16. The non-transitory computer-readable medium of claim 15, wherein the instructions cause the programmable processor to receive at least one of the first external data or the second external data by at least receiving data indicative of at least one of a taxi time of the aircraft during the first braking event or the second braking event, respectively, or a taxi route of the aircraft during the first braking event or the second braking event, respectively.

17. The non-transitory computer-readable medium of claim 15, wherein the instructions cause the programmable processor to generate the first cost value by at least increasing or decreasing the predetermined baseline cost value by the first total change in the predetermined baseline cost value to the first cost value, and generate the second cost value by at least increasing or decreasing the predetermined baseline cost value by the second total change in the predetermined baseline cost value to the second cost value.

* * * * *